April 18, 1950 S. BENZER 2,504,627

ELECTRICAL DEVICE WITH GERMANIUM ALLOYS

Filed March 1, 1946

INVENTOR.
Seymour Benzer,
BY
Brown, Jackson, Boettcher & Dienner
Attys.

Patented Apr. 18, 1950

2,504,627

UNITED STATES PATENT OFFICE 2,504,627

ELECTRICAL DEVICE WITH GERMANIUM ALLOYS

Seymour Benzer, West Lafayette, Ind., assignor to Purdue Research Foundation, La Fayette, Ind., a corporation of Indiana Application March 1, 1946, Serial No. 651,271

15 Claims. (Cl. 201—76)

My present invention relates to an improvement in electrical devices, and more particularly to electrical devices which are sensitive to externally applied energy.

The electrical devices of my invention are constructed in the manner of a point contact rectifier and comprise a semi-conductor element consisting of certain germanium alloys with the surface of which semi-conductor a whisker or electrode of the device has point contact.

Certain of the germanium alloys of which the semi-conductor element of the electrical device of my invention may be formed are not alloys in the common meaning of that word, in that, for example, an alloy of germanium and the gas, nitrogen, is suitable for forming a semi-conductor in constructing a device in accordance with my invention. However, for purposes of the present disclosure it will be understood that the word alloy means to include a union of germanium with one or more other elements and the other element or elements may be of metal, non-metals, or gases, and the combination of which exhibits electrical properties such as are found in metals and semi-conductors.

In the copending application of Karl Lark-Horovitz and Randall M. Whaley, Serial No. 604,744, filed July 13, 1945, there is disclosed various alloys of which germanium comprises the principal constituent. From these alloys rectifiers may be made which present high resistance to current flow in one direction therethrough and a lower resistance to current flow in the other direction. In that application, the semi-conductors disclosed are all of the type upon the surfaces of which points may be found which exhibit N-type rectifying characteristics, i. e., they present high resistance to current flow across a rectifying contact when the semi-conductor is positive, and the contacting metal electrode or whisker is negative, and a lower resistance when the polarity of the applied voltage on the semi-conductor and electrode is reversed. My present invention proceeds upon the discovery that certain of the alloys of the application last referred to in certain instances have P-type regions thereon, i. e., regions which produce rectifying contacts of polarity opposite to that of the N-type regions.

In such alloys having N-type regions and P-type regions there exist certain transition regions therebetween in which the current-voltage characteristics thereof are sensitive to externally applied energy, such as in the form of light or heat or combination of both, when the potential on the semi-conductor is negative and the potential upon the whisker is positive.

For such polarity of the semi-conductor and electrode selected points of contact on the semi-conductor in the transition regions thereof between the P and N-type regions may be readily found which exhibit the following characteristic. As the current is progressively increased the resistance to current flow in the low resistance direction is positive up to a certain point, hereinafter referred to as the "trigger peak" and after which the differential resistance becomes negative for a certain range of current and then becomes positive again. Points may be found in such transition regions of the semi-conductors where the trigger peak occurs at small currents of the order of 0.1 to 5 milliamperes, and at voltages of 0.1 to 25 volts depending upon the selected point of contact on the surface of the semi-conductor. This range of values may be observed with the device in the dark and at a temperature of the order of 25° C. I have discovered that this trigger peak is sensitive to externally applied energy, in the form of light especially in the near infra-red, and to heat, and to combinations of light and heat. For a selected point of contact, which in the dark at room temperature and with that temperature being maintained substantially constant and in which the trigger peak occurs at, for example, a value of about 5 volts, it has been found that the trigger peak will be reduced to about 3 volts when white Mazda light of an intensity of about 0.5 lumen/cm.$^2$ is projected on the selected point of contact. If stronger light of about 2 lumens/cm.$^2$ white light is projected on the contact the differential negative resistance is entirely removed. The same effect may be observed with the device maintained in the dark upon progressively increasing the temperature of the rectifying contact. For the above illustrative selected point of contact the trigger peak at 5 volts occurs at a temperature of about 25° C. Upon increasing the temperature to about 50° C. the trigger peak occurs at about 3 volts. Further increase in the temperature to the order of 100° C. causes the complete removal of the negative resistance characteristic. This behavior of the device may be utilized to make a relay type of photosensitive or thermosensitive cell. The device may, for example, be biased to closely approach the trigger peak of a selected point of contact. Now, when light or heat of a predetermined amount, as described in detail hereinafter, is applied to the selected point of contact, the trigger peak disappears so that a trigger effect occurs with the current jumping to a much higher value. This latter value is determined by the second positive resistance region, above referred to, and the resistance in an external circuit with which the device may be incorporated. A jumping current by as much as a factor of 500 has been obtained with certain selected points of certain of the germanium crystals used by me in constructing devices in accordance with my present invention. In many instances with several of the alloys sufficient current was obtained to operate a relay directly. Upon removal of the light or heat, the electrical characteristics of the semi-conductors return to their original values. However, if a D. C. potential is applied to the device, the voltage must be removed for an instant if the original current in the absence of light or heat is to be restored. When using alternating voltage across the contact this restoration is automatically achieved each cycle. The use of alternating current is possible since the current-voltage characteristic for the other polarity, i. e., when the semi-conductor is positive and the whisker is negative remains at a relatively high resistance even under changes of temperature and light. Thus in using an A. C. potential, the current produced will automatically be rectified when the device is actuated by light or temperature.

It will be understood, of course, that all sensitive regions having the general characteristic above described do not all show the same degree of sensitivity to light or temperature. However, for a contact of good sensitivity to light, the voltage of the trigger peak will fall to one-half of its dark value when it is illuminated with about one lumen per square inch of white light. This corresponds with the intensity of illumination produced by a 100 watt Mazda lamp at a distance of one foot. Only the light which falls within the immediate neighborhood of the contact point is effective. Therefore, a much weaker source of illumination may be used provided the light is condensed to a small spot or region. As is usual with photosensitive devices, the sensitivity varies with the wave length of the light used. The device herein described shows maximum sensitivity in the neighborhood of 1.3 microns which falls in the near infra-red region of wave length. It is of practical interest to note that the spectral intensity distribution of the Mazda lamp has its maximum in the same region of wave lengths. When the device is used, for example, in detecting temperature changes (in the dark) a rise in temperature from 25° C. to 50° C. is generally sufficient to cause the voltage of the trigger peak to drop by one-half.

The trigger peak characteristic described above is not exhibited by all rectifying contacts made upon the surfaces of germanium alloy semi-conductors. However, many of the semi-conductors comprising a germanium alloy disclosed in the aforesaid application of Messrs. Lark-Horovitz and Whaley suitable points may be found exhibiting this type of characteristic which, as previously noted occurs in regions between such alloys which exhibit both the N and P-type rectification. For a contact showing N-type rectification the lower resistance to the flow of current occurs when the semi-conductor is negative. A contact showing P-type rectification has the opposite polarity. The devices of my invention therefore may be readily produced from germanium alloys, certain examples of which are hereinafter referred to in greater detail, possessing P and N-type areas or regions. Upon the identification of such germanium alloys the transition regions between the P and N-type regions may be probed with a whisker and points will be readily found thereon which exhibit the characteristics utilizable in devices coming within my invention.

It is an object of my invention to provide an electrical device having electrical resistance properties which change reversibly with changes in externally applied energy.

A further object is to provide an electrical device comprising a semi-conductor consisting of an alloy of germanium having P-type and N-type regions with an electrode or whisker having point contact with a selected point on the surface of a semi-conductor in a transition region thereof between the P and N-type regions, which contact point exhibits variable resistance to current flow in one direction therethrough dependent upon predetermined externally applied energy on the selected point of contact.

A further object is to provide an electrical device comprising a semi-conductor consisting of an alloy of germanium having P-type and N-type regions with an electrode or whisker having point contact with a selected point on the surface of the semi-conductor in a transition region thereof between the P-type and N-type regions, which contact point exhibits variable resistance to current flow in one direction therethrough dependent upon predetermined light applied to the selected point of contact.

A further object is to provide an electrical device comprising a semi-conductor consisting of an alloy of germanium having P-type and N-type regions with an electrode or whisker having point contact with a selected point on the surface of the semi-conductor in a transition region thereof between the P-type and N-type regions, which contact point exhibits variable resistance to current flow in one direction therethrough dependent upon predetermined temperature of the selected point of contact.

A further object is to provide an electrical device comprising a semi-conductor consisting of an alloy of germanium having P-type and N-type regions with an electrode or whisker having point contact with a selected point on the surface of the semi-conductor in a transition region thereof between the P-type and N-type regions, which when positive potential is applied to the whisker and negative potential to the semi-conductor is characterized by a positive resistance being presented to current flow therethrough followed by a negative resistance which in turn is followed by a positive resistance in which the first positive resistance and the negative resistance characteristics are variable upon predetermined applied radiant energy either in the form of light or heat to the selected point of contact.

A further object is to provide an electrical device comprising a semi-conductor consisting of an alloy of germanium having P-type and N-type regions with an electrode or whisker having point contact with a selected point on the surface of a semi-conductor in a transition region thereof between the P-type and N-type regions, which when positive potential is applied to the whisker and negative potential to the semi-conductor is characterized by a first positive resistance to current flow therethrough followed by a negative resistance which in turn is followed by a second positive resistance which upon predetermined externally applied energy in the form of light or heat is effective to cause a current jump from the first positive resistance to the second positive resistance across the intervening negative resistance.

The above and other objects and advantages of my invention will appear from the detail description.

Now, in order to acquaint those skilled in the art with the manner of constructing and utilizing electrical devices in accordance with my invention, I shall describe in connection with the accompanying drawings certain preferred embodiments of my invention.

Figure 1:
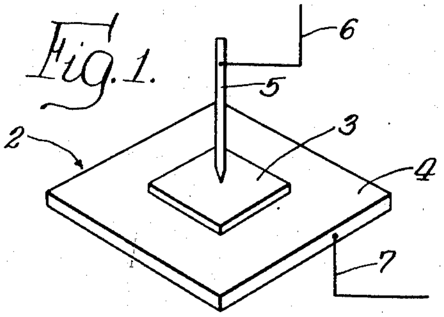
Figure 1 is a diagrammatic view of an electrical device sensitive to externally applied energy, constructed in accordance with my invention.
Figures 2, 4, 5, 6:
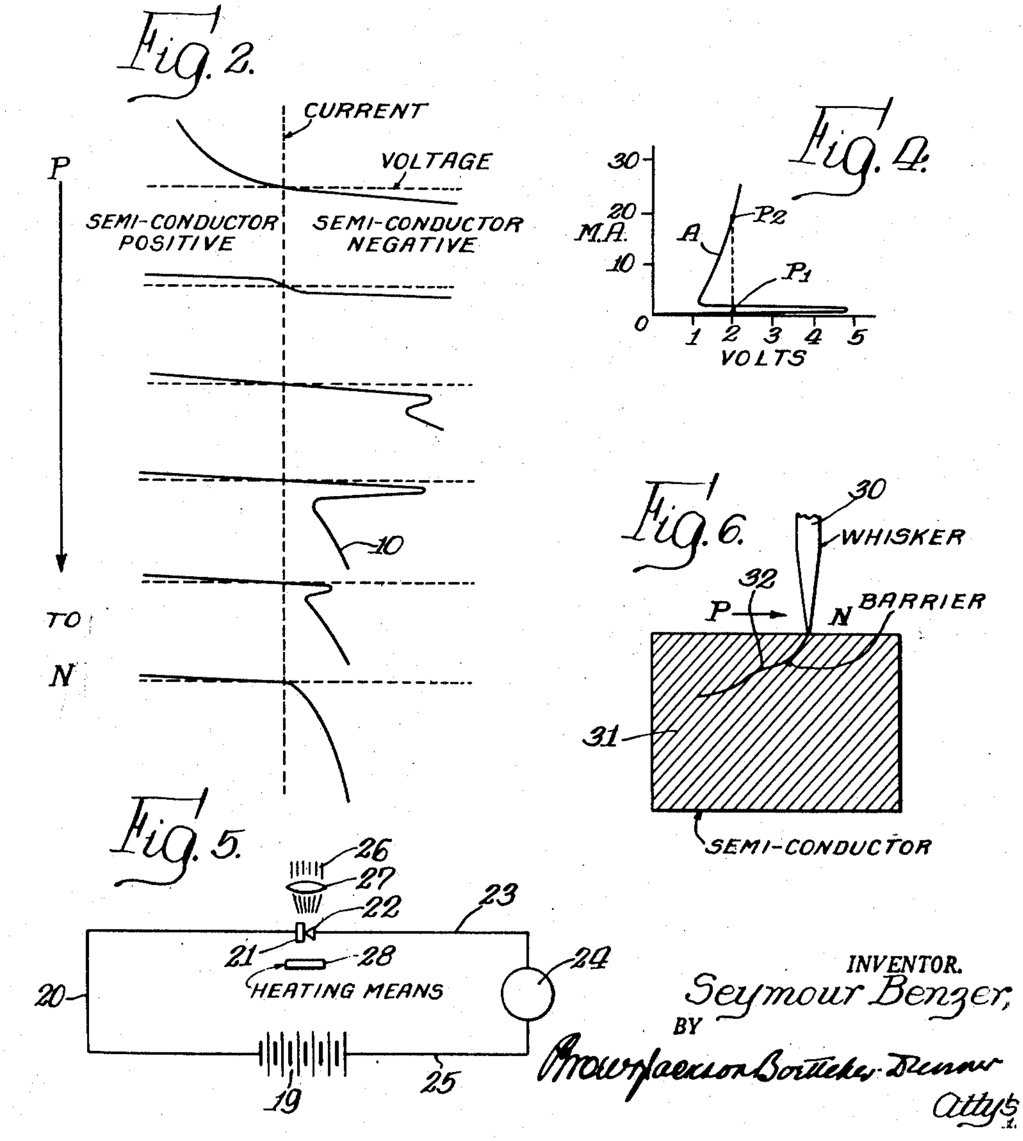
Figure 2 is a graphic illustration of the progressive changes in the electrical characteristics of point contacts made at different points in a transition region between P-type and N-type regions on the surface of the semi-conductor element of the device of Figure 1.
Figure 4 is a graph similar to Figure 3 with the current scale reduced and illustrating the trigger effect which may be obtained with the device of Figure 1.

Figure 5 is a typical simple circuit diagram in which the device of Figure 1 may be embodied; and Figure 6 is a diagrammatic illustration of what is believed to be the physical structure of the semi-conductor of Figure 1 showing the whisker or electrode having contact with a barrier between the P-type and N-type regions in the semi-conductor element accounting for the energy sensitive character of the device.

Referring now to the drawing, I have shown in Figure 1 an electrical device 2 comprising a semi-conductor 3 made of a germanium alloy to be referred to in greater detail hereinafter. The semi-conductor 3 is preferably soldered to a conductor plate 4 of any metal or alloy having good electrical conductivity characteristics. An electrode or whisker is formed with a pointed end which makes point contact with the surface of the semi-conductor 3. The electrode or whisker 5 is made of a metal or alloy having good electrical conductivity and preferably of good mechanical strength. Several metals that have been found satisfactory for use in making the electrode or whisker are tungsten, platinum, copper, iron, gold, silver, manganese, tantalum, nickel, zinc, molybdenum, zirconium, lead, and platinum-iridium alloys. The electrode 5 preferably is provided with a sharp pointed end having a tip diameter of the order of 0.0001 inch. These electrodes may be readily made by forming suitable points on wires of about 0.005 inch in diameter. A lead 6 is suitably connected to the electrode 5 and a lead 7 has connection with the conductor plate 4 upon which the semi-conductor is mounted.

As above related, various germanium alloys are disclosed in the copending application of Karl Lark-Horovitz and Randall M. Whaley, Serial No. 604,744, filed July 13, 1945, among which the alloys hereinafter referred to on occasion were found to have both N-type and P-type regions.

These several alloys consist of germanium with the amounts of the alloying elements as follows, except in the case of nitrogen, being set forth in atomic percent, i. e., the proportionate number of atoms in percent of the elements added to the total number of atoms of germanium and added elements present: tin .05 to 17.0; calcium .50 to 2.0; strontium .5 to 1.0; lead 1.3 to 3.0; magnesium 3.0. In the germanium-nitrogen alloy nitrogen may be solidified at pressures of 2, 18, 600 and 760 mm. Hg.

These several germanium alloys may be prepared in all cases except for the germanium-nitrogen alloy, by melting pure germanium with the desired alloying element in either a high vacuum of the order of 10–5 mm. mercury at about 1000° C., or in an atmosphere of helium. Alloying germanium with nitrogen may be effected by melting the germanium in an atmosphere of nitrogen which may be either purified nitrogen or nitrogen direct from a commercial cylinder. The germanium is melted in nitrogen at pressures ranging from about 2 mm. to 760 mm. Hg at a temperature of 1000° C. to 1100° C. for about 5 to 15 minutes.

In the germanium-tin alloy it has been found that about 0.1 atomic percent of tin content effects separation of the tin in veins in the germanium so that tin in excess of this amount probably has no effect in the alloy. As a general observation, it may be stated that the alloying of any of the above elements, except for nitrogen, in a range of about .1 to 1 atomic percent of the added element, will on occasion provide alloys having P and N-type regions or areas.

In the above alloys points may be found which exhibit N-type rectification that is relatively low resistance to current flow when the potential upon the semi-conductor is negative and the potential upon the whisker or electrode is positive as compared with the resistance to current flow through the device when the potentials upon the semi-conductor and electrode or whisker are reversed. Also, in the above alloys points of contact may be found which exhibit P-type rectification which is opposite to that of the above referred to N-type rectification. The points sensitive to radiant energy may be found in the region separating the P and N-type areas of the above alloys. Of the above referred to alloys I have found that the germanium alloys consisting of pure germanium and of about 0.1 to 2 atomic percent of pure tin and the germanium-nitrogen alloys while primarily having points thereon exhibiting N-type rectification disclosed in the above application quite frequently possess easily identifiable regions having the P-type characteristic. In using the above germanium alloys of the above application for constructing an electrical device in accordance with my present invention, it is preferable to grind a flat surface on the alloy and then etch the surface to facilitate finding of the desired points of contact in the transition region. One suitable abrasive for grinding the surface of the alloy is 600 mesh alumina ($Al_2O_3$). Various etching solutions and techniques may be used to advantage and it has been found that an etch consisting of four parts of hydrofluoric acid (48% reagent), four parts distilled water, two parts concentrated nitric acid, and 200 milligrams $CU(NO_3)_2$ to each 10 cc. of solution is satisfactory. This solution will produce a satisfactory etching of the ground surface in about one to two minutes. Also, while the germanium-nitrogen alloy prepared as above described is suitable in constructing devices in accordance with my invention, it has been found that such germanium alloys may be further treated to increase or provide for an abundance of P-type regions in the alloy. This treatment of the germanium-nitrogen alloy to create a large number or abundance of P-type regions is disclosed in detail in the copending application of Randall M. Whaley, Serial No. 655,225, filed March 18, 1946, to which reference may be had. As disclosed in that application, the above alloy after the above grinding and etching steps is heat-treated in vacuum at about 650° C. to 700° C. for about one-half hour to one hour. When the alloy is subjected to this heat treatment it has been discovered that a large number of P-type regions will appear on the surface of the alloy as distinguished from the appearance of mostly N-type regions thereon prior to the heat treatment step. In the transition regions between the P and N-type regions thus created a substantial number of sensitive points may be found in view of which the alloys of the application last referred to are particularly adapted in constructing devices in accordance with my invention.

While the above alloys of germanium-tin and germanium-nitrogen are preferred in practicing my invention in that the P and N-type regions on such alloys may be readily found, it will be understood that the other alloys above referred to will in many instances exhibit such P and N-type areas, and which are suitable for use in constructing devices in accordance with my invention.

A further observation of interest is that high purity germanium is usually of P-type, so that the addition of small traces of N-type producing impurities frequently results in providing in such germanium P to N-type transition regions where the sensitive contact points herein described may be found. Also, frequently, control melts, that is, melts made without deliberate additions of impurities for purposes of testing the purity of germanium and possible contamination of the melting furnace and associated apparatus have been found to contain small amounts of N-type producing impurities leading to the production of crystals having the desired transition regions.

In Figure 2 of the drawing, I have illustrated certain curves showing the changes in the current-voltage characteristics of selected contacts made at points selected progressively from a P-type region to an N-type region. For purposes of constructing an electrical device in accordance with my invention, the characteristic indicated by the curve designated by the reference numeral 10 has been found to be the most suitable.

Figure 3:
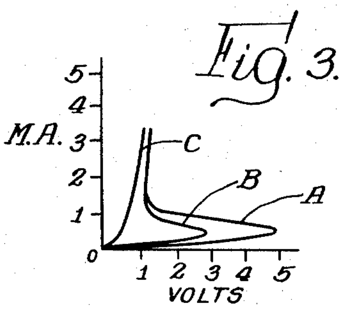
Figure 3 is a graph illustrating the effect of light or heat upon the electrical characteristics of the device of Figure 1.

The effect of light with the temperature being held constant at about 25° C. on a selected point of contact is illustrated in Figures 3 and 4 of the drawing. In these graphs the current-voltage characteristic with a selected point of contact between the electrode 5 and the semi-conductor 3 being maintained in the dark is shown by the curve A. It will be observed that in Figure 4 the current ordinate is considerably reduced with respect to the current ordinate of Figure 3. Curve B illustrates the current-voltage characteristic when white light of about 0.5 lumen/cm.$^2$ is projected on the selected point of contact between the whisker 5 and the semi-conductor 3. Curve C illustrates the current-voltage characteristics when white light of about 2 lumens/cm.$^2$ is projected on the selected point of contact of the whisker with the semi-conductor from which it will be seen that the trigger peak is completely removed. It will be further observed from curves A and B of Figure 3 and curve A of Figure 4 that as the current through the devices is progressively raised, the resistance is positive up to a certain point herein designated as "trigger peak" after which the differential resistance becomes negative for a certain range of value and then becomes positive again. This "trigger peak" occurs at small currents of the order of 0.1 to 5 milliamperes and points of contact may be found in the devices of my invention at voltages of a range of about 0.1 to 25 volts. Also for such points the currents in the negative resistance are of the order of 0.1 to 10 milliamperes at 0.1 to 25 volts, and the second positive resistance ranges from 50 to several hundred ohms.

Reference may now be had to Figure 4 which illustrates the trigger effect characteristic. Under a D. C. bias of about 2 volts there is only a small current. However, if white light of about 0.7 lumen/cm.$^2$ is projected on the selected point of contact, the current immediately jumps to a value of about 20 milliamperes which is sufficient to effect operation of a relay or other electrical apparatus with which the device may be connected in circuit. The current jump is shown in Figure 4 with the point $P_1$ illustrating the current at a D. C. bias of about 2 volts across a selected point of contact of the whisker 5 with a semi-conductor 3 and with the device in the dark. Now when light of about 0.7 lumen/cm.$^2$ is projected on the selected point of contact, the current immediately jumps to the point $P_2$ on curve A providing for current flow the order of 20 ma. The above values, it will be understood, are only representative of one set of conditions obtainable on a selected point of contact between the electrode and semi-conductor and it will be understood that other points of contact lying within the above range may be found in the transition regions of the semi-conductors. Of course, different D. C. bias voltages may be used within the range above set out for selected point of contact on the semi-conductors.

The effect of temperature with the illumination held constant is also illustrated by curves A, B and C of Figures 3 and 4. With the device maintained in the dark at a temperature of about 25° C. points may be found on the semi-conductors which will give the current-voltage characteristics shown by curve A of the values previously stated and as shown in these figures. As the temperature is raised to the order of 50° C. for the selected point of contact, the current-voltage characteristics will be that of curve B and of the values previously stated and as shown by the figure. As the temperature is raised to that of the order of 100° C., the current-voltage characteristics will be that of curve C above referred to.

It is believed that from the above it will be clear that the device may also be caused to be actuated by selected combinations of applied light and heat.

A typical circuit embodying the device of Figure 1 is shown in Figure 5 of the drawings. As shown in this figure, the circuit comprises a source of current, either alternating or direct, 19, from which a lead 20 extends to a germanium alloy semi-conductor 21 of the type above described having the properties previously referred to. An electrode 22 makes a rectifying contact with a selected point on the surface of the semi-conductor 21. A lead 23 extends from the electrode 22 to a current responsive device 24 which in turn is connected by lead 25 to the source of current 19. A source of light 26 which may, if desired, be concentrated by a lens 27, is directed upon the selected point of contact between the electrode 22 and the semi-conductor 21. The intensity of the light may be varied in any suitable manner to actuate the device, which in turn will alter the current flow through the current responsive device 24. The latter device may, for example, be a current indicator or a relay to be actuated by the current flow, for example, of the value at $P_2$ of Figure 4. It is understood that a heat source or means 28 may be substituted for the light source 26, as above explained, to provide a thermosensitive device within the ranges above set forth to control the current responsive device 24, or if desired, various combinations of both light and heat from sources 26 and 28 may be utilized to effect actuation of the device.

Figure 6 shows diagrammatically an arrangement of an electrode 30 having contact with a selected point of the semi-conductor 31. It is thought that the semi-conductor 31 has a barrier such as designated at 32 extending between and separating P-type and N-type regions of the semi-conductor. It is believed, although not at present definitely ascertained, that the energy sensitive characteristic occurs when the electrode has contact with the semi-conductor at the point where the barrier meets the surface of the semi-conductor. At any event, points may be found in the transition region between N-type and P-type regions in the alloys of my invention which will exhibit the electrical effect above described within the ranges stated.

Further, little is known of the effect impurities such as nitrogen and tin have in the germanium. It is thought that the impurities are ionized and account in some manner for the conductivity of the alloy. However, it is quite feasible the effect could be due to a change in lattice structure of the germanium due to the presence of an impurity or impurities together with further changes in the germanium-nitrogen alloys due to the heat treatment which accounts for the results obtained.

I claim:

1. An electrical device comprising a semi-conductor consisting of a body of an alloy of substantially pure germanium having an impurity or impurities therein and having P-type and N-type regions of the character described, and a conductor of good electrical conductivity in contact with a point on the surface of the semi-conductor in the transition region between said P-type and N-type regions selected to provide the property that the current-voltage characteristic is variable upon the application of predetermined amount of light on the selected point of contact.

2. An electrical device comprising a semi-conductor consisting of a body of an alloy of germanium having a purity of the order of 99% and having an impurity or impurities therein selected to provide P-type and N-type regions of the character described and a conductor of good electrical conductivity in contact with a point on the surface of the semi-conductor in a transition region between said P-type and N-type regions selected to provide the property that when positive potential is applied to said conductor and negative potential to said semi-conductor the device is characterized by a first positive resistance to current flow followed by a negative resistance which in turn is followed by a second positive resistance, and means for projecting light upon the selected point of contact between said conductor and said semi-conductor, whereby said first positive resistance is variable upon application of a predetermined amount of light applied to said selected point of contact by said means.

3. An electrical device comprising a semi-conductor consisting of a body of an alloy of germanium and tin with the tin being present non-uniformly in an amount of the order of 0.5 atomic percent and having P-type and N-type regions of a character described and a conductor of good electrical conductivity in contact with a point on the surface of said semi-conductor in a transition region between said P-type and N-type regions selected to provide the property that the resistance to current flow in the low resistance direction of current flow through the device is variable upon the application of predetermined energy on the selected point of contact.

4. An electrical device comprising a semi-conductor consisting of a body of an alloy of germanium and tin with the tin being present non-uniformly in an amount of the order of 0.5 atomic percent and having P-type and N-type regions of a character described and a conductor of good electrical conductivity in contact with a point on the surface of said semi-conductor in a transition region between said P-type and N-type regions selected to provide the property that the resistance to current flow in the low resistance direction of current flow through the device is variable upon the application of predetermined light on the selected point of contact.

5. An electrical device comprising a semi-conductor consisting of a body of an alloy of germanium and tin with the tin being present non-uniformly in an amount of the order of 0.5 atomic percent and having P-type and N-type regions of a character described and a conductor of good electrical conductivity in contact with a point on the surface of said semi-conductor in a transition region between said P-type and N-type regions selected to provide the property that the resistance to current flow in the low resistance direction of current flow through the device is variable upon the application of predetermined heat on a selected point of contact.

6. An electrical device comprising a semi-conductor consisting of a body of an alloy of germanium and nitrogen and having P-type and N-type regions of the character described, and a conductor of good electrical conductivity in contact with a point on the surface of said semi-conductor in the transition region between said P-type and said N-type regions selected to provide the property that the resistance to current flow in the low resistance direction of current flow through the device is variable upon the application of predetermined energy on the selected point of contact.

7. An electrical device comprising a semi-conductor consisting of a body of an alloy of germanium and nitrogen and having P-type and N-type regions of the character described, and a conductor of good electrical conductivity in contact with a point on the surface of said semi-conductor in the transition region between said P-type and said N-type regions selected to provide the property that the resistance to current flow in the low resistance direction of current flow through the device is variable upon the application of predetermined light on the selected point of contact.

8. An electrical device comprising a semi-conductor consisting of a body of an alloy of germanium and nitrogen and having P-type and N-type regions of the character described, and a conductor of good electrical conductivity in contact with a point on the surface of said semi-conductor in the transition region between said P-type and said N-type regions selected to provide the property that the resistance to current flow in the low resistance direction of current flow through the device is variable upon the application of predetermined heat on the selected point of contact.

9. An electrical device comprising a semi-conductor consisting of a body of an alloy of germanium having a purity of the order of 99% and having an impurity or impurities therein selected to provide P-type and N-type regions of the character described, and a conductor of good electrical conductivity in contact with a point on the surface of the semi-conductor in a transition region between said P-type and N-type regions selected to provide the property that when positive potential is applied to said conductor and negative potential to said semi-conductor the device is characterized by a first positive resistance to current flow followed by a negative resistance which in turn is followed by a second positive resistance, and means for projecting light upon the selected point of contact between said conductor and said semi-conductor, whereby said first positive resistance is variable upon application of a predetermined amount of light applied to said selected point of contact by said means, and said device being further characterized by the property that predetermined applied light to said selected point of contact is effective to cause a current jump from said first positive resistance to said second positive resistance across said negative resistance.

10. An electrical device comprising a semi-conductor consisting of a body of an alloy of germanium having a purity of the order of 99% and having an impurity or impurities therein having P-type and N-type regions of the character described, and a conductor of good electrical conductivity in contact with a point on the surface of said semi-conductor in the transition region between said P-type and N-type regions selected to provide the property that upon application of predetermined amount of light on the selected point of contact the resistance to current flow through the device is substantially diminished.

11. An electrical device comprising a semi-conductor consisting of a body of an alloy of germanium having a purity of the order of 99% and having an impurity or impurities therein selected to provide P-type and N-type regions of the character described, and a conductor of good electrical conductivity adapted to have contact with a point on the surface of said semi-conductor in a transition region between said P-type and N-type regions selected to provide when positive polarity is applied to said conductor and negative polarity to said semi-conductor the property that a voltage peak occurs which may be 0.1 to 25 volts and at currents of the order of 0.1 to 5 milliamperes characterized by the voltage at a given current being adapted to be reduced upon the application of a predetermined amount of light applied to said selected points of contact.

12. An electrical device comprising a semi-conductor consisting of a body of an alloy of germanium having a purity of the order of 99% and having an impurity or impurities therein selected to provide P-type and N-type regions of the character described, and a conductor of good electrical conductivity adapted to have contact with a point on the surface of said semi-conductor in a transition region between said P-type and N-type regions selected to provide when positive polarity is applied to said conductor and negative polarity to said semi-conductor the property that a voltage peak occurs which may be at voltages of the order of 0.1 to 25 volts and at currents of the order of 0.1 to 5 milliamperes followed by a negative resistance and, at higher currents by a positive resistance of the order of 50 to several hundred ohms, and further characterized by being adapted by the application of predetermined amount of light applied to said selected points of contact to provide substantially instantaneously a positive resistance characteristic of current flow of the order of 50 to several hundred ohms.

13. An electrical device comprising a semi-conductor consisting of a body of an alloy of germanium having a purity of the order of 99% and having an impurity or impurities therein selected to provide P-type and N-type regions of the character described, and a conductor of good electrical conductivity in contact with a point on the surface of the semi-conductor in a transition region between said P-type and N-type regions selected to provide the property that when positive potential is applied to said conductor and negative potential to said semi-conductor the device is characterized by a first positive resistance to current flow followed by a negative resistance which in turn is followed by a second positive resistance, and means for projecting light upon the selected point of contact between said conductor and said semi-conductor, whereby said negative resistance is variable upon application of a predetermined amount of light applied to said selected point of contact by said means.

14. An electrical device comprising a semi-conductor consisting of a body of germanium and an impurity or impurities therein and having a sensitive region including N-type or P-type regions or areas of rectification therein, a metallic conductor of good electrical conductivity in contact with the surface of said semi-conductor and with respect to said N-type and P-type regions to provide the characteristic that a flow of current is affected by the application of light to said sensitive region.

15. An electrical light responsive device comprising a semi-conductor consisting of a body of germanium having an impurity or impurities therein and having a sensitive region including N-type and P-type regions or areas of rectification therein, and a metallic conductor of good electrical conductivity in contact with the surface of said semi-conductor and with respect to said N-type and P-type regions to provide the characteristic of flow of current of the order of 0.1 to several milliamperes through said devices upon application of light of the order of one lumen per square centimeter to said sensitive region with the temperature maintained at substantially 25° C.

SEYMOUR BENZER.

REFERENCES CITED

The following references are of record in the file of this patent:

Bidwell's "Resistance . . . of Germanium," in the Physical Review, volume 19, 1922, pages 447–455.

Merritt, Rectification by Metallic Germanium, pages 743–748, 1925.